E. P. GAINES.
Millstone Dress.
No. 11,372.
Patented July 25, 1854.
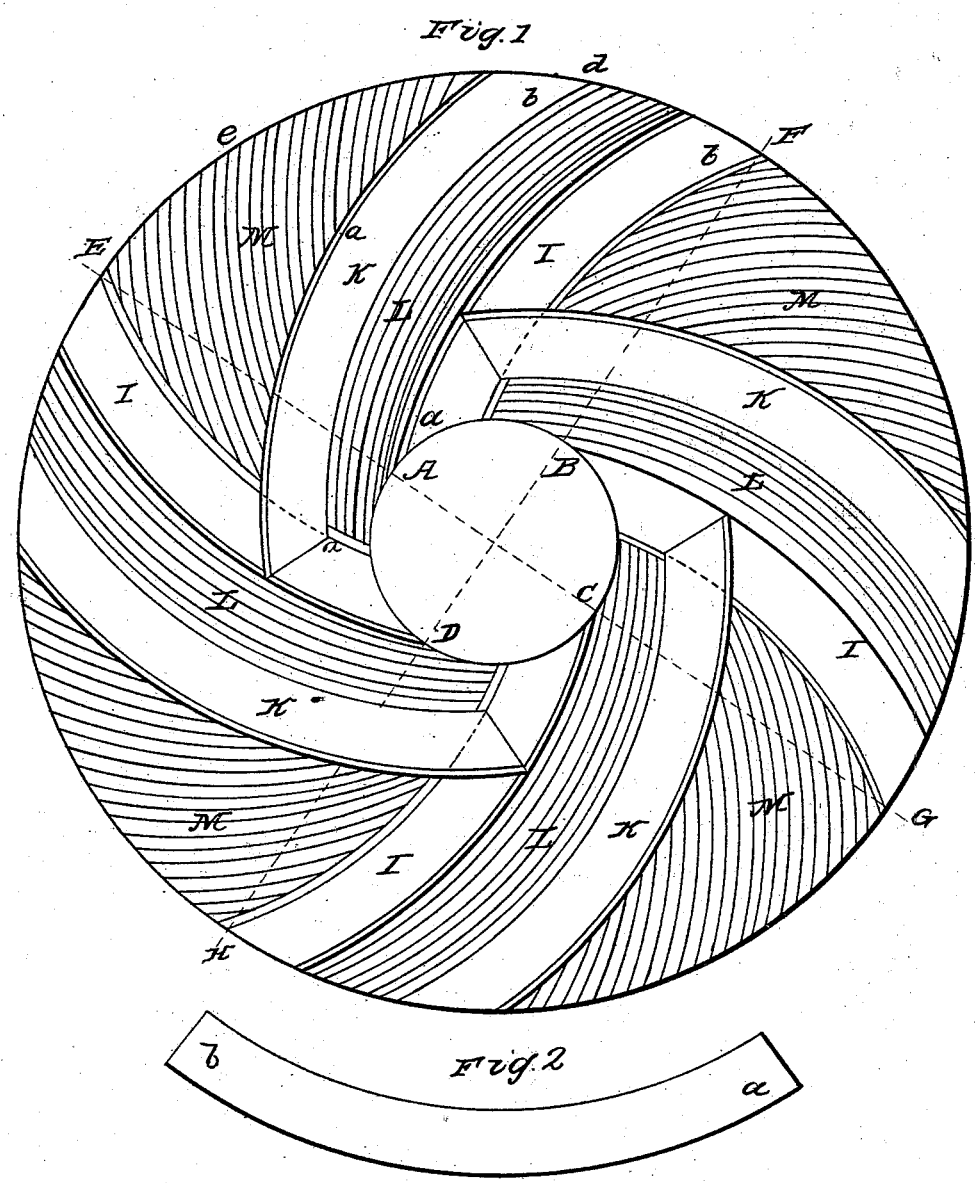

UNITED STATES PATENT OFFICE.

EDMUND P. GAINES, OF MELROSE, TEXAS.

MILLSTONE-DRESS.

Specification of Letters Patent No. 11,372, dated July 25, 1854.

*To all whom it may concern:*

Be it known that I, EDMUND P. GAINES, of Melrose, in the county of Nacogdoches and State of Texas, have invented a new and improved mode of dressing millstones used for grinding grain of every description, but peculiarly adapted to grinding wheat and those varieties denominated "red;" and I do hereby declare that the following is a full, clear, and exact description of the same, reference being had to the accompanying drawings, and letters of reference thereon, forming part of this specification.

The general characteristics of the improvement I now desire to secure by Letters Patent is, first, that of dressing the mill stones in equal quarters, or dividing it into four equal spaces, not by radial or straight furrows from the center to the periphery, but by curved ones, and by so arranging the secondary furrows (also curved) in conjunction with the master furrows that the eye of the stone will not be cut up, and the face or grinding surface destroyed; this I effect by making only four master furrows, which alone entering the eye of the stone, serve as leads or conduits for delivering the grain to others, and instead of having these the longest, the secondary furrows really become so from the position they occupy to the periphery of the stone.

By my method I am enabled to reduce the labor of dressing the stones and greatly increase the efficiency of the power applied, by the grinding surface being preserved near the center, the resistance is proportionately reduced, while the feed is also more regularly received, and distributed to the more distant portions of the stone, and in a condition to offer less resistance, as the husk or envelop is removed near the eye, and is by the draft of air (received with the grain) blown or carried toward the circumference, where it is rubbed by the lands and triangles of the face, and instead of being ground, is merely flattened and submitted to an action resembling that of a bran duster, the fine grooves on the face cleaning the flour from the bran in its passage. By this separation of the husk in flakes instead of by grinding it, the color of the flour and specky condition thereof is avoided; and as the amylum and body of the grain is nearly alike in all kinds of wheat, I am by this improvement, not only enabled to make superfine flour from red wheat, as from white, but to increase the product in superfine and reduce the offal from a given quantity of wheat, and as before observed with less expenditure of power and liability to choke; while by the deep and open furrow and their form, the draft of air is increased and driven with the grain and the stones kept cool.

A summary of the advantages is as follows, viz: The grinding more grain with less power; increasing the quantity of superfine and the reduction of offal; making superfine and bright flour from red wheat; keeping the stones cool, and consequent improvement of flour for keeping; prevention of choking.

To enable others skilled in the art to make and use my improvement, I will first describe the preparation of the stones: After the pair designed to run together have been reduced as near as practicable to a plane, they are run together and faced, but instead of using sand and water in so doing, I use soap and water alone, thereby avoiding the creation of concentric rings, which result from the use of sand; this may appear an immaterial matter, but having been tested in practice, I know the disadvantage arising from a coarse ground face. The next step is to determine the rule or make the pattern which is a curved one, by which all the furrows and lands are laid off. It is as follows: Take the same radius with which the stone was formed (that is, if a four-foot stone, use a two foot radius) and strike a line upon a properly prepared board. This will give the inside line or concave edge; then lay off the width of the intended furrow (which I prefer shall be greater than usual) and strike another circle or portion thereof, outside of that first made, which will give the convex edge of of the pattern; the surplus wood having been removed, the pattern presents the shape as seen in Fig. 2. With this all the furrows, not only the four master ones, but the secondary ones are marked out and the lands and triangles determined. The face of the stone is now divided into four equal parts, by simply drawing lines in pencil or making points viz, A B C D at the edge of the eye, and E F G H at the circumference; to one of these points A, apply the convex side or edge *a* of the pattern, Fig. 2, and moving said pattern around to the next quarter on the periphery—viz., F—apply the concave edge *b* of the pattern to said point F, then scribe by each edge *a* and *b*, and you have marked the first master furrow I, which it will be noticed has a quarter draft of the circumference; proceed in the same manner with the three remaining master furrows, and the stone will be quartered in reality, but not as the term is used. The first land L, is now laid out by placing the concaved side *b* of the pattern to the convex line of the master furrow, and scribe the convex line on the stone only at the ends *d, d,* of the arc, then move the pattern, observing to place the concave edge *b* of said pattern so as to touch the short lines last described, at the periphery and at its junction with the master furrow, this will make the land L, slightly wider at the center thereof; now scribe by both edges of the pattern and you have one of the secondary furrows K, which ordinarily is shorter than a master furrow, but in this plan it is longer, being the effect of its position to the periphery. Should the stone be large an additional set of furrows outside the secondary may be made observing the same rule in laying off the intervening lands, and ceasing when the length thereof approaches that of the master furrow, it being necessary to preserve a sufficient size of the triangles M, or that portion of the face at the periphery. The remaining quarters are similarly laid off and both stones being thus furrowed, necessarily reverse the position of these furrows on being placed on each other. To cut or form these furrows, which as before observed are bold and deep, varying from a quarter of an inch in open or porous, to a half an inch deep in close ground rock: observing to make the furrow deeper as the diameter of the stone increases; also that the depth of the furrow be gradually increased say 1/8 of an inch at the eye of the stone than at the periphery, for the purpose of more readily receiving the grain between the stones.

The furrows are formed with nearly perpendicular sides on the convex side *a*, thereof, and rise gradually with a gentle concave, and form a feather edge on the concave side *b* of the furrow; the effect of which will be the keeping the furrow clear of baking, by drawing the ground grain toward and on the lands of the stone. The small grooves on the lands L between the furrows, are laid parallel to the edges of the land, but on the triangles M a different rule is observed, viz., after forming a parallel line next the feather edge of the master furrow, divide the periphery between the master furrow and the last secondary, into three points, draw a line by laying the edge of the pattern on the first point *e* and on the apex of the triangle and scribe, which will constitute a baseline from which all the others on both sides are set off; these grooves are very slight, and the intention of change in direction or position, is to counteract the tendency of the ground grain to fly off, by centrifugal action, as well as that of tracking in the furrows: and it is on these large triangles that the rubbing of the bran or broken husk takes place by which it is divested of every particle of flour as in a bran duster. In setting the bush as there is no bosom given the stone, I prefer driving the bush a little lower say an eighth or a quarter of an inch, to prevent the driving around of the grain by the runner.

I cannot better illustrate the points of improvement I now desire to secure by Letters Patent over my mill stone dress for which I obtained Letters Patent March 4, 1851, than by adverting to the defects of said dress. In that dress I fell into the error in common with others of cutting away the eye of the stone by the number of furrows entering it, and as a consequence, the loss of grinding face at the short leverage; secondly, in giving the secondary furrows two great freedom of action, by which the grain was imperfectly reduced.

By my recent improvements of increasing the length of draft of the master furrow, and by a change in the mode of constructing the rule or pattern from that of 1851 (above alluded to,) and by giving the secondary furrow an increased length over the master one, and increased centripetal action by this change, the grain is better ground with the same sized stone, and in greater quantities in proportion to speed, than could be done by the dress of 1851, and consequently a new and useful result is produced. Bearing in mind, that the pattern by which all the dress is laid off is differently created or constructed from the patent of 1851; that the length of the secondary furrow in one case is longer than the master one, while in the other that it is shorter, and that in the one dress too much centrifugal freedom is allowed, while the other combines the centrifugal and centripetal with great advantage.

Having described the nature of this improvement upon the mill stone dress secured to me in Letters Patent March 4, 1851, and disclaiming all intention of embracing in the present patent, any of the grounds covered by the one aforementioned, what I claim as my invention and desire to secure by Letters Patent is—

The manner of laying off the dress of mill stones with four curved master furrows I, I, I, I, (by which I gain a draft equal to one fourth the circumference), in connection with secondary furrows laid according to the directions before given, for the purpose of more effectually grinding grain, increasing the quantity, ground with a given power, producing a better yield of superfine flour
5 and avoiding both the choking and undue heating of the stones, in the manner substantially set forth.

In testimony whereof I have hereunto signed my name before two subscribing witnesses.

E. P. GAINES.

Witnesses:
  JOHN F. CLARK,
  SAML. GRUBB.